(12) United States Patent
Huber et al.

(10) Patent No.: US 7,199,513 B2
(45) Date of Patent: Apr. 3, 2007

(54) DISCHARGE LAMP HAVING TWO-BAND PHOSPHOR

(75) Inventors: Günter Huber, Schrobenhausen (DE); Frank Jermann, München (DE); Ulrich Müller, München (DE); Martin Zachau, Geltendorf (DE)

(73) Assignee: Patent-Treuhand-Gesellschaft fuer Elektrische Gluehlampen mbH, Munich (DE)

( * ) Notice: Subject to any disclaimer, the term of this patent is extended or adjusted under 35 U.S.C. 154(b) by 201 days.

(21) Appl. No.: 10/858,202

(22) Filed: Jun. 2, 2004

(65) Prior Publication Data

US 2004/0251807 A1    Dec. 16, 2004

(30) Foreign Application Priority Data

Jun. 13, 2003    (DE) ................. 103 26 755

(51) Int. Cl.
*H01J 1/62* (2006.01)
*H01J 1/63* (2006.01)

(52) U.S. Cl. ................ 313/486; 313/485; 313/487

(58) Field of Classification Search ........ 313/583–587
See application file for complete search history.

(56) References Cited

U.S. PATENT DOCUMENTS

| | | | |
|---|---|---|---|
| 5,604,410 A | 2/1997 | Vollkommer et al. ....... 315/246 |
| 5,714,835 A * | 2/1998 | Zachau et al. ............ 313/486 |
| 5,994,849 A | 11/1999 | Vollkommer et al. |
| 6,045,721 A * | 4/2000 | Zachau et al. ........ 252/301.4 R |
| 6,466,135 B1 * | 10/2002 | Srivastava et al. .......... 313/486 |
| 6,641,448 B2 * | 11/2003 | Wang et al. ................. 445/24 |
| 6,844,671 B2 * | 1/2005 | Setlur et al. ................ 313/486 |
| 2003/0092345 A1 | 5/2003 | Wang et al. ................. 445/23 |
| 2004/0056256 A1 | 3/2004 | Bokor et al. ................. 257/79 |
| 2004/0188697 A1 | 9/2004 | Brunner et al. ............... 257/99 |
| 2004/0217687 A1 * | 11/2004 | Heider et al. ............... 313/486 |

FOREIGN PATENT DOCUMENTS

| | | |
|---|---|---|
| EP | 1 076 084 A3 | 1/2002 |
| JP | 11273625 A * | 10/1999 |
| WO | WO 8100028 A1 * | 1/1981 |
| WO | WO 8100031 A1 * | 1/1981 |
| WO | WO 02/11214 A1 | 2/2002 |
| WO | WO 03/005458 A1 | 1/2003 |

* cited by examiner

*Primary Examiner*—Mariceli Santiago
(74) *Attorney, Agent, or Firm*—Robert F. Clark

(57) ABSTRACT

A discharge lamp (1) having a discharge vessel (2) that surrounds a discharge medium that emits electromagnetic radiation in the VUV region during operation of the lamp, has on the inner side of the discharge vessel wall a yellow phosphor layer facing the discharge medium, and a blue phosphor layer lying therebelow. By contrast with a conventional three-band phosphor mixture, a higher luminous flux and a smaller color locus displacement are thereby achieved.

3 Claims, 3 Drawing Sheets

DISCHARGE LAMP HAVING TWO-BAND PHOSPHOR

TECHNICAL FIELD

The invention proceeds from a discharge lamp having phosphor and in which electromagnetic radiation predominantly in the vacuum ultra violet (VUV) region is emitted during operation by a discharge medium contained inside the discharge vessel of the discharge lamp. Here, wavelengths below approximately 200 nm are understood as being in the VUV region, in particular in the region from approximately 100 nm to 200 nm. The VUV radiation is converted with the aid of the phosphor into radiation with longer wavelengths, for example into the visible spectral region.

In particular, the invention also relates to discharge lamps of the abovementioned type that are designed, furthermore, for operation by means of dielectrically impeded discharge, so-called dielectric barrier discharge lamps. Such discharge lamps are prior art per se, and have already been presented in the most varied details in earlier patent applications of the same applicant. No further details will be given here of the fundamental physical and technical details of such discharge lamps, but instead of this reference is made to the relevant prior art, in which these lamps are also sometimes denoted as quiet discharge lamps. They are also suitable, a particular, for a pulsed mode of operation returning a particular good efficiency of the generation of radiation. These lamps are typically filled with inert gas, preferably xenon, or inert gas mixtures. During the operation of the lamp, excimers, for example $Xe_2^*$, are produced, in particular, inside the discharge vessel and emit a molecular band radiation with a maximum at approximately 172 nm.

The VUV radiation is converted by means of suitable white light phosphor mixtures for applications that presuppose white light, for example for general illumination, color scanners, backlighting of color liquid crystal display screens and the like. For this purpose, consideration is given conventionally to three-band phosphor mixtures of a red-, green- and blue-emitting phosphor component (RGB). However, there is the problem that during the course of the lifetime of the lamp the blue phosphor components normally used are in particular damaged by the VUV radiation, and thereby lose luminosity. The luminosity of the individual phosphor components of a phosphor mixture thereby vary differently, and an increasing color locus displacement results. Moreover, the radiation emitted by blue phosphor components is displaced into longer-wave spectral regions. In addition, the known red phosphor components have relatively poor quantum efficiency for excitation with VUV radiation.

BACKGROUND ART

Patent specification U.S. Pat. No. 5,714,835 exhibits a dielectric barrier discharge lamp having a white light phosphor mixture. The components of this white light phosphor mixture are the red phosphor component $(Y_{0.72}Gd_{0.2}Eu_{0.08})BO_3$, the green phosphor component $(La_{0.43}Ce_{0.39}Tb_{0.18})PO_4$ and the blue phosphor component $(Ba_{0.94}Eu_{0.06})MgAl_{10}O_{17}$.

The inert gas xenon is located as discharge medium in the interior of the lamp. During operation of the lamp, the discharge medium emits radiation with wavelengths shorter than 200 nm, which are converted into white light by the white light phosphor mixture.

DISCLOSURE OF THE INVENTION

It is the object of the present invention to dispose of the problems mentioned at the beginning and to specify a discharge lamp that has phosphor, is filled with a discharge medium emitting VUV radiation during operation, and which exhibits an improved long-term behavior with regard to its lighting properties. A specific aspect of the object is that the lamp exhibits a smaller color locus displacement during its lifetime. A further aspect of the object is to achieve a higher luminous flux.

This object is achieved by means of a discharge lamp having a discharge vessel, a discharge medium that is located in the interior of the discharge vessel and emits electromagnetic radiation in the VUV region during operation of the lamp and a phosphor that is applied to the wall of the discharge vessel, the phosphor consisting of a yellow and of a blue phosphor component (two-band phosphor).

Since the phosphor manages according to the invention without the red phosphor component, that is to say dispenses precisely with the phosphor component having a relatively poor VUV excitation efficiency, it is possible in this way to achieve higher luminous fluxes.

The two phosphor components can be applied in principle as a phosphor mixture in a single phosphor layer. This has the advantage that the color locus obtained for the phosphor radiation is independent of fluctuations in the production of the layer thickness set, and can therefore be kept constant more easily and exactly than when each of the two phosphor components is applied in a separate layer each. Other details on this are to be found in the exemplary embodiments.

However, it can also be advantageous to apply the two phosphor components in a separate phosphor layer each, that is to say in a yellow and a blue phosphor layer. In a first variant, the sequence of the phosphor layers is such that when viewed from the discharge medium the yellow phosphor layer, for example YAG:Ce, comes first, followed by the blue phosphor layer, for example $BaMgAl_{10}O_{17}$:Eu. For this purpose, both phosphor layers are applied to the inner side of the wall of the discharge vessel, specifically the blue phosphor layer below the yellow phosphor layer. This has the additional advantage that the yellow phosphor layer partially absorbs the high-energy VUV radiation, and thus protects the VUV-sensitive blue phosphor layer situated there below. An improved long-term behavior of the blue phosphor layer is finally thereby achieved. Finally, as a result of the above-named measures, the reduction, mentioned at the beginning and usually associated with the VUV irradiation, in the luminosity of these VUV-sensitive phosphors is avoided or at least reduced, as is the color locus displacement resulting therefrom in the case of phosphor mixtures. Moreover, the specific selection of a yellow/blue phosphor combination permits the elimination of a relatively inefficient red phosphor component such as, for example, $YBO_3$:Eu. It is thereby possible to achieve a higher luminous flux.

In the second variant, the two phosphor components are applied in the reverse sequence, that is to say the "outer" phosphor layer that is first with reference to the discharge medium consists of the blue phosphor component, for example $BaMgAl_{10}O_{16}$:Eu. The "inner" phosphor layer that is second with reference to the discharge medium consists, by contrast, of the yellow phosphor component, for example YAG:Ce. Moreover, in this case the thickness of the "outer"

blue phosphor layer is selected such that the VUV radiation entering the blue phosphor layer is essentially completely absorbed there and so the "inner" yellow phosphor layer situated there below is essentially completely shielded from the VUV radiation. The yellow phosphor is thereby excited exclusively by the blue radiation emitted by the blue phosphor layer. The result of this is that in the course of the burning life of the lamp the yellow radiation reduces in the same ratio as the blue radiation owing to the degradation of the blue phosphor layer by the impinging VUV radiation. As end effect, the achievement of these measures is that the color locus advantageously remains constant virtually independently of the lamp operating time. Layer weights in the range between approximately 3.20 and 3.40 mg/cm² have proved to be suitable in the case of the use of $BaMgAl_{10}O_{16}$: Eu for the "outer" blue phosphor layer.

All known yellow or blue phosphor components that can be excited with VUV radiation, preferably those with a high quantum efficiency, are suitable in principle. The phosphors set forth below are particularly suitable individually.

For example, the following is suitable as yellow phosphor component:

A) (Y, Gd, Tb)AG:Ce.

For example, the following are suitable as blue phosphor component:

B) $BaMgAl_{10}O_{17}$: Eu;
C) $SrMgAl_{10}O_{17}$:Eu;
D) $(Ba, Sr)MgAl_{10}O_{17}$:Eu.

Slight variations in the stoichiometric compositions of the phosphor components set forth above are customary, and are therefore also covered by the above descriptions.

BRIEF DESCRIPTION OF THE DRAWINGS

The aim below is to explain the invention in more detail with the aid of exemplary embodiments. In the figures.

BEST MODE FOR CARRYING OUT THE INVENTION

Figure 1A:
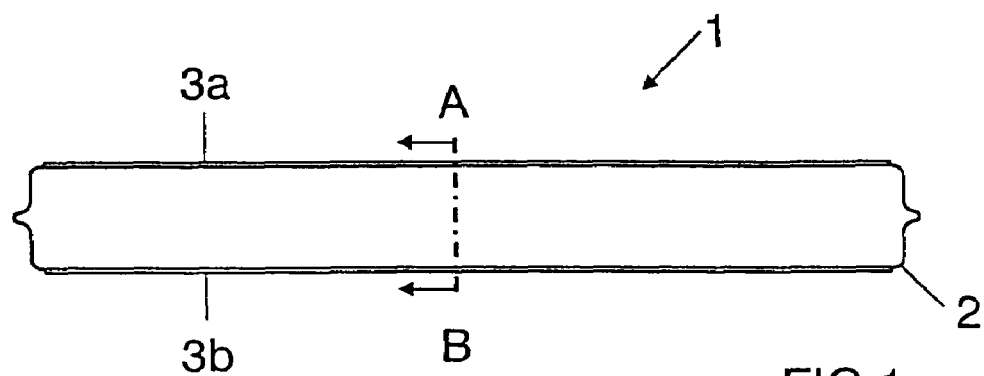
FIG. 1a shows a first exemplary embodiment of a dielectric barrier discharge lamp in side view.
Figure 1B:
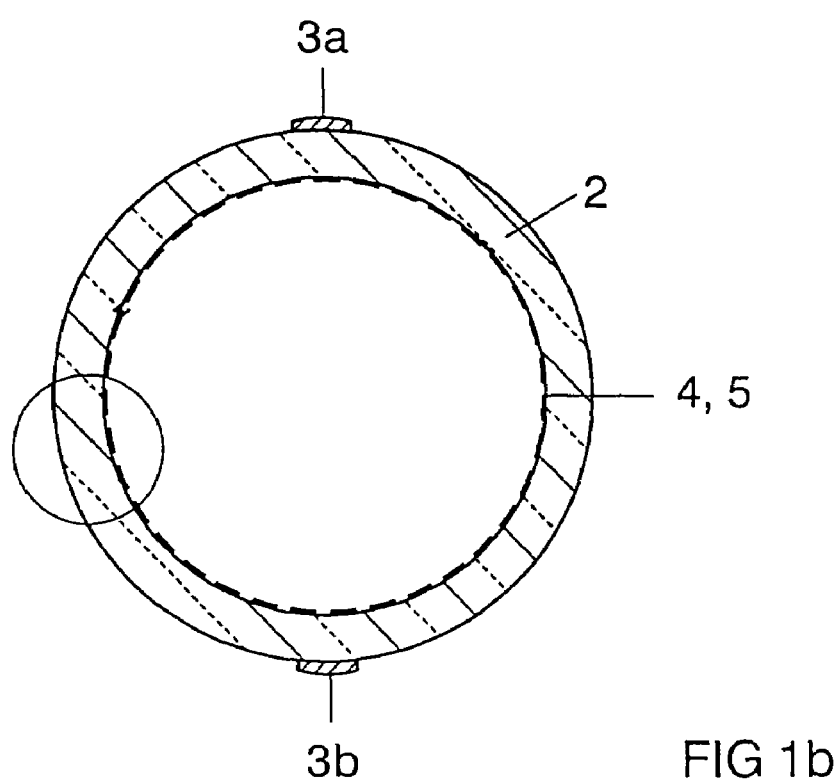
FIG. 1b shows a cross section of the lamp from FIG. 1a along the line AB.
Figure 1C:
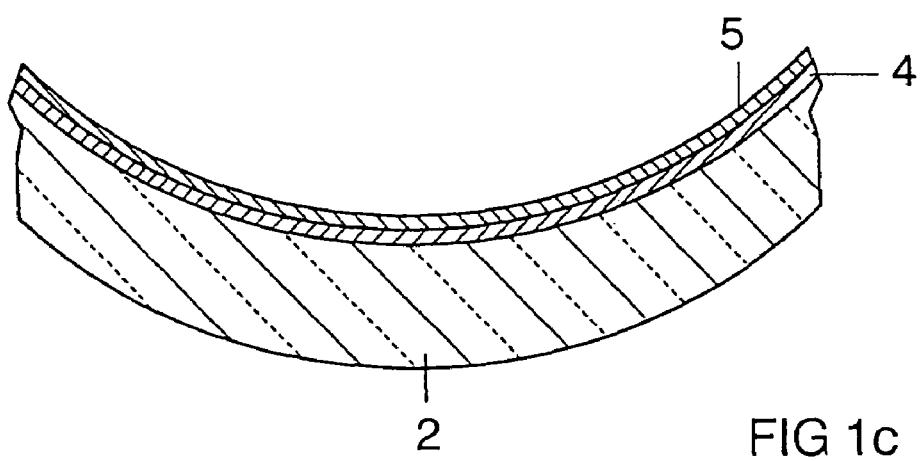
FIG. 1c shows an enlarged detail of the cross section from FIG. 1b.

Reference is made to FIGS. 1a–1c in the discussion below of an exemplary embodiment of the invention.

The discharge lamp 1 has a tubular discharge vessel 2 that is sealed at both ends and has an outside diameter of approximately 10 mm. The discharge vessel 2 consists of soda-lime glass and is filled with xenon at a pressure of approximately 15 kPa as discharge medium. Two metal electrodes 3a, 3b constructed as linear conductor tracks are applied diametrically opposite one another and parallel to the longitudinal axis of the discharge vessel on the outer side of the wall of the discharge vessel 2. An "inner" phosphor layer 4 and an "outer" phosphor layer 5 are applied to the inner side of the wall of the discharge vessel 2 (approximately 450 cm²). The "outer" phosphor layer 5, which is first with reference to the discharge medium, consists of the yellow phosphor component YAG:Ce. The "inner" phosphor layer 4, which is second with reference to the discharge medium, consists of $BaMgAl_{10}O_{16}$:Eu.

A number of test lamps having different layer weights or ratios of the layer weights of the two layers 4 and 5, respectively, were produced for this lamp type I. The coordinates of the color loci thereby achieved (in conformity with the CIE standard chromaticity diagram) are set forth in the following table.

| Lamp No. | Layer 5 (mg/cm²) | Layer 4 (mg/cm²) | Ratio Layer 4/5 | x | y |
|---|---|---|---|---|---|
| 1 | 2.69 | 3.22 | 1.20 | 0.420 | 0.501 |
| 2 | 2.87 | 3.07 | 1.07 | 0.423 | 0.501 |
| 3 | 3.02 | 2.84 | 0.94 | 0.424 | 0.500 |
| 4 | 1.78 | 2.91 | 1.64 | 0.415 | 0.498 |
| 5 | 1.11 | 3.00 | 2.70 | 0.391 | 0.474 |
| 6 | 1.27 | 2.82 | 2.23 | 0.402 | 0.490 |
| 7 | 0.62 | 2.44 | 3.93 | 0.336 | 0.395 |
| 8 | 0.69 | 2.62 | 3.81 | 0.343 | 0.408 |
| 9 | 0.76 | 2.73 | 3.62 | 0.356 | 0.425 |
| 10 | 0.49 | 2.84 | 5.82 | 0.309 | 0.355 |
| 11 | 0.49 | 2.98 | 6.09 | 0.317 | 0.367 |
| 12 | 0.38 | 3.07 | 8.12 | 0.290 | 0.328 |

Figure 2:
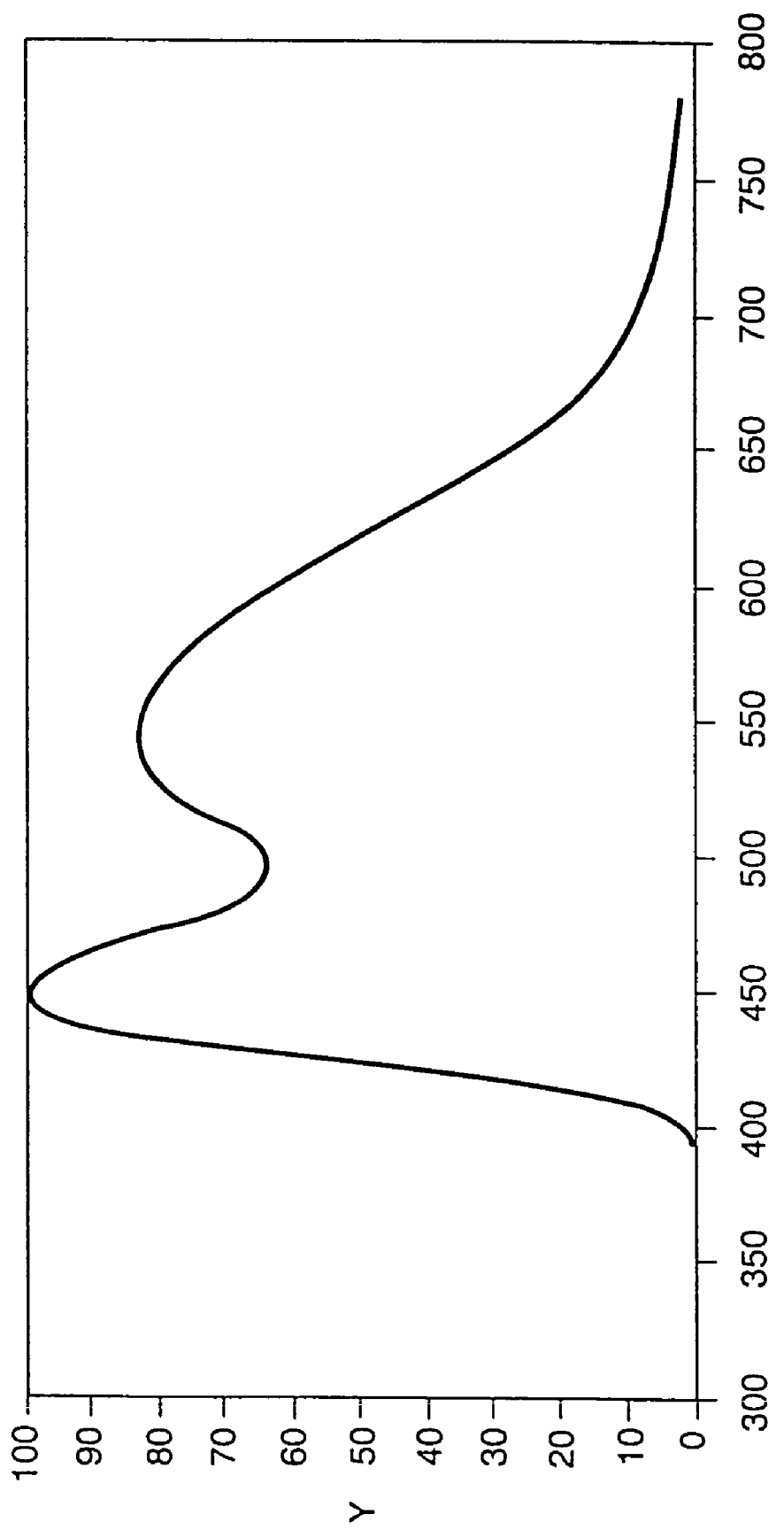
FIG. 2 shows a spectrum of a test lamp in accordance with FIGS. 1a–1c.

By comparison with a comparable standard RGB lamp, a corrected growth in brightness of 13% was achieved with lamp No. 12. The measured spectrum of this lamp is illustrated in FIG. 2. Here, the Y- and X-axes respectively show the relative energy and the wavelength in nm.

Figure 3A:
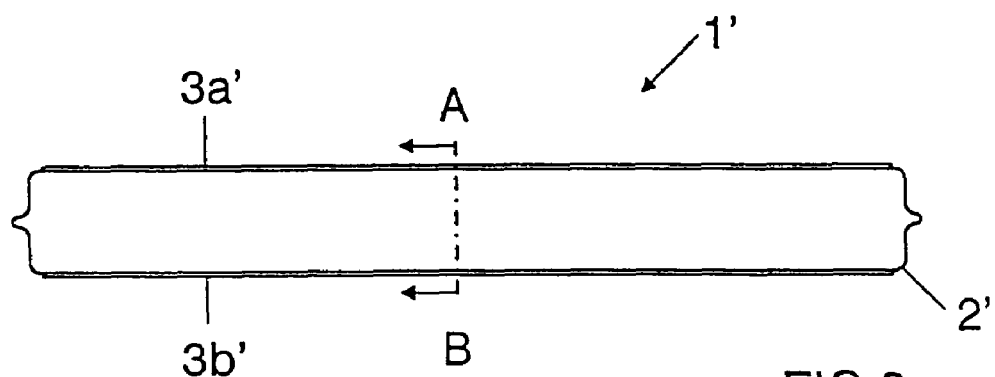
FIG. 3a shows a second exemplary embodiment of a dielectric barrier discharge lamp in side view.
Figure 3B:
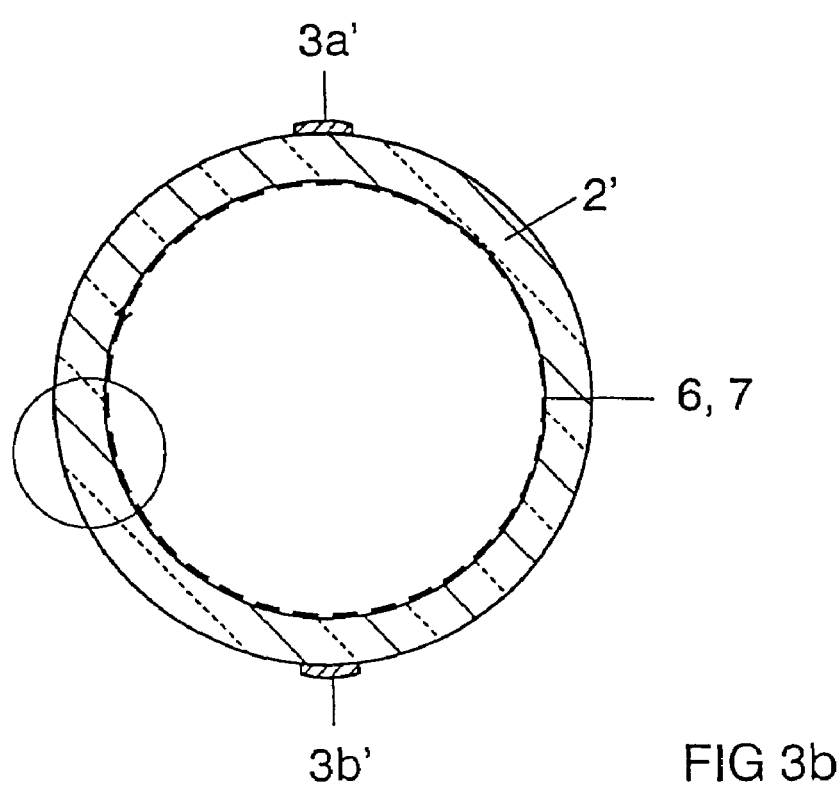
FIG. 3b shows a cross section of the lamp from FIG. 3a along the line AB.
Figure 3C:
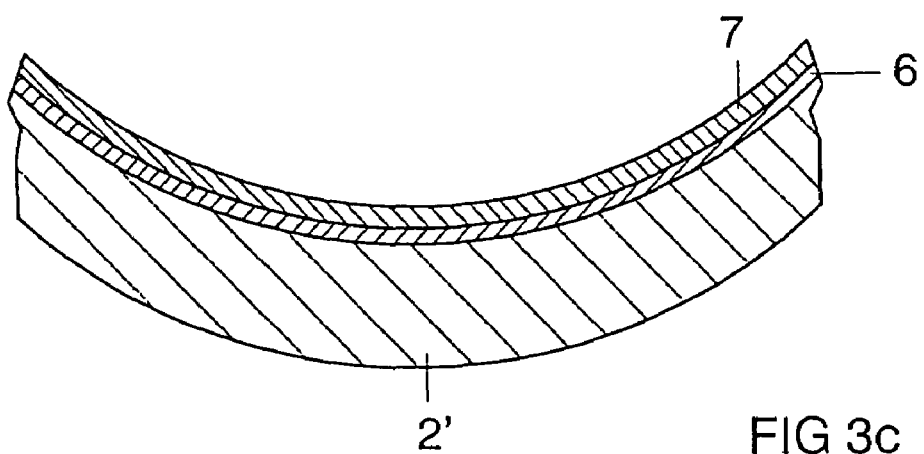
FIG. 3c shows an enlarged detail of the cross section from FIG. 3b.

Reference is made to FIGS. 3a–3c for the following explanation of a further exemplary embodiment of the invention.

Here, the two phosphor components are applied in the reverse sequence than in the first exemplary embodiment, that is to say the "outer" phosphor layer 7, which is first with reference to the discharge medium, consists of the blue phosphor component $BaMgAl_{10}O_{16}$:Eu. The "inner" phosphor layer 6, which is second with reference to the discharge medium, consists of the yellow phosphor component YAG: Ce. A number of test lamps having a different layer thickness ratio of blue and yellow phosphor, respectively, were produced for this lamp type II. The coordinates of the color loci thereby achieved (in conformity with the CIE standard chromacicity diagram) are set forth in the following table. The layer thicknesses are expressed in this case by the corresponding layer weights, as is generally customary.

| Lamp No. | Layer 7 (mg/cm²) | Layer 6 (mg/cm²) | Ratio Layer 6/7 | x | y |
|---|---|---|---|---|---|
| 13 | 3.20 | 0.36 | 0.11 | 0.201 | 0.182 |
| 14 | 3.36 | 0.39 | 0.12 | 0.209 | 0.195 |
| 15 | 3.39 | 0.45 | 0.13 | 0.209 | 0.194 |
| 16 | 3.34 | 1.00 | 0.30 | 0.276 | 0.300 |
| 17 | 3.39 | 1.00 | 0.29 | 0.287 | 0.312 |
| 18 | 3.27 | 0.88 | 0.27 | 0.275 | 0.296 |

A further exemplary embodiment relates to a variant (not illustrated) of the lamp from the two previous exemplary embodiments, but with only one phosphor layer, in which the blue phosphor component $BaMgAl_{10}O_{16}$:Eu (BAM) and the yellow phosphor component YAG:Ce (YAG) are mixed.

A number of test lamps with a different ratio of blue and yellow phosphors were likewise produced for this lamp type III. The coordinates of the color loci thereby achieved (in conformity with the CIE standard chromaticity diagram) are set forth in the following table.

| Lamp No. | Layer (mg/cm$^2$) | Ratio BAM/YAG | X | Y |
|---|---|---|---|---|
| 19 | 3.18 | 95/5 | 0.194 | 0.174 |
| 20 | 3.27 | 95/5 | 0.198 | 0.183 |
| 21 | 3.27 | 85/15 | 0.283 | 0.310 |
| 22 | 3.32 | 85/15 | 0.288 | 0.317 |
| 23 | 3.14 | 85/15 | 0.284 | 0.311 |
| 24 | 3.36 | 75/25 | 0.337 | 0.383 |
| 25 | 3.22 | 75/25 | 0.329 | 0.373 |
| 26 | 3.09 | 75/25 | 0.327 | 0.370 |

The following table shows an overview of the maintenance data of the test lamps from the above described exemplary embodiments after a burning life of 100 and 500 hours, respectively. As may be seen, all three types (I, II, III) of the two-band lamps display an increased color locus stability by contrast with the compared conventional three-band design (RGB), and although that design in which the blue phosphor layer faces the discharge (type II) exhibits the highest decrease in luminous flux, at the same time it has the highest color locus stability.

| | 0–100 h | | | 0–500 h | | |
|---|---|---|---|---|---|---|
| Lamp type | Rel. luminous flux (%) | Δx | Δy | Rel. luminous flux (%) | Δx | Δy |
| I | −7% | 0.003 | 0.002 | −8% | 0.003 | 0.002 |
| II | −7% | −0.001 | 0.003 | −12% | −0.001 | 0.003 |
| III | −4% | 0.003 | 0.002 | −8% | 0.003 | 0.003 |
| RGB | −5% | 0.006 | 0.005 | −7% | 0.007 | 0.009 |

Although the invention has been explained above using the example of a tubular discharge lamp, it is not restricted to this lamp type. Rather, the invention develops its advantageous effect independently of the form of discharge vessel. Consequently, flat forms of lamp, for example, as disclosed in document U.S. Pat. No. 5,994,849 by way of example, are just as suitable. Moreover, it is fundamentally immaterial whether the electrodes are arranged on the outer side of the discharge vessel wall or, alternatively, on the inner side and are covered with a dielectric layer. Likewise, the electrodes can also be completely unimpeded. What is decisive within the context of the problems outlined at the beginning is merely that the discharge medium emits VUV radiation during operation of the lamp. However, dielectric barrier discharge lamps enjoy a certain preference in this regard because, as already mentioned at the beginning, they enable particularly efficient production of VUV radiation in a specific pulsed operation.

What is claimed is:

1. A discharge lamp, comprising:
a discharge vessel containing a discharge medium, the discharge medium emitting VUV electromagnetic radiation during operation of the lamp; and
first and second phosphor layers, the first phosphor layer comprising a phosphor selected from a (Ba,Sr)MgAl$_{10}$O$_{17}$:Eu phosphor, a BaMgAl$_{10}$O$_{17}$:Eu phosphor, and a SrMgAl$_{10}$O$_{17}$:Eu phosphor, the second phosphor layer comprising a (Y,Gd,Tb)AG:Ce phosphor, wherein the second phosphor layer is applied to a wall of the discharge vessel and the first phosphor layer is applied over the second phosphor layer so that the first phosphor layer is between the discharge medium and the second phosphor layer, the first phosphor layer having a thickness that is sufficient to essentially completely absorb the VUV radiation from the discharge medium whereby the (Y,Gd,Tb)AG:Ce phosphor in the second phosphor layer is excited exclusively by blue radiation emitted from the first phosphor layer.

2. The discharge vessel as claimed in claim 1, wherein the discharge medium is xenon.

3. The discharge lamp as claimed in claim 2 wherein the first phosphor layer comprises a BaMgAl$_{10}$O$_{17}$:Eu phosphor and has a layer weight in the range between 3.20 and 3.40 mg/cm$_2$.

* * * * *